United States Patent [19]
Russell et al.

[11] Patent Number: 5,252,086
[45] Date of Patent: Oct. 12, 1993

[54] MODULAR POWERWAY WITH SELECTABLE RECEPTACLE

[75] Inventors: Scott H. Russell, Kalamazoo; Craig M. Anderson, Kentwood; Steven C. Deer, Kentwood; Mark T. Slager, Kentwood; David A. VanDyke, Grand Rapids; Charles C. Ondrejka, Muskegon; Jerry P. White, Kentwood, all of Mich.

[73] Assignee: Steelcase Inc., Grand Rapids, Mich.

[21] Appl. No.: 889,665

[22] Filed: May 28, 1992

[51] Int. Cl.$^5$ .......................................... H01R 13/74
[52] U.S. Cl. .................................. 439/215; 439/152; 439/211
[58] Field of Search ............... 439/207–216, 439/152, 296, 170, 171, 174

[56] References Cited

U.S. PATENT DOCUMENTS

| | | | |
|---|---|---|---|
| Re. 31,733 | 11/1984 | Haworth et al. | 439/207 |
| 4,203,639 | 5/1980 | VanderHoek et al. | 439/215 |
| 4,235,495 | 11/1980 | Propst et al. | 439/215 |
| 4,239,932 | 12/1980 | Textorie et al. | 174/48 |
| 4,308,418 | 12/1981 | Van Kuik et al. | 439/209 |
| 4,367,370 | 1/1983 | Wilson et al. | 439/215 |
| 4,370,008 | 1/1983 | Haworth et al. | 439/165 |
| 4,376,561 | 3/1983 | Vanden Hoek et al. | 439/210 |
| 4,377,724 | 3/1983 | Wilson | 174/48 |
| 4,382,648 | 5/1983 | Propst et al. | 439/209 |
| 4,429,934 | 2/1984 | Vanden Hoek et al. | 439/207 |
| 4,666,223 | 5/1987 | Tillmann | 439/215 |
| 4,684,186 | 8/1987 | Hetherington | 439/171 |
| 4,740,167 | 4/1988 | Millhimes et al. | 439/92 |
| 4,775,328 | 10/1988 | McCarthy | 439/211 |
| 4,781,609 | 11/1988 | Wilson et al. | 439/215 |
| 4,918,886 | 4/1990 | Benoit et al. | 52/221 |
| 4,952,164 | 8/1990 | French et al. | 439/215 |
| 4,992,058 | 2/1991 | Tanner | 439/211 |
| 5,087,207 | 2/1992 | Byrne | 439/215 |
| 5,096,431 | 3/1992 | Byrne | 439/215 |
| 5,096,434 | 3/1992 | Byrne | 439/215 |
| 5,131,860 | 7/1972 | Bogiel | 439/215 |
| 5,203,711 | 4/1993 | Bogiel | 439/211 |

FOREIGN PATENT DOCUMENTS 2080047  5/1980  United Kingdom .

Primary Examiner—Gary F. Paumen
Attorney, Agent, or Firm—Price, Heneveld, Cooper, DeWitt & Litton

[57] ABSTRACT

A power distribution system for office furniture includes a powerway having a power block with power block conductors therein. A outlet block is supported on the powerway and includes outlets for the office furniture. The outlets are connected to different conductors in the powerway by a jumper. The powerway may include at least three first connectors on one end and at least one second connector on the other end. The first and second connectors interconnect thereby facilitating connection with other identical powerways. According to one aspect, one component includes a projection and another component includes a recess which facilitate connection of these components using a substantially flat implement.

31 Claims, 11 Drawing Sheets

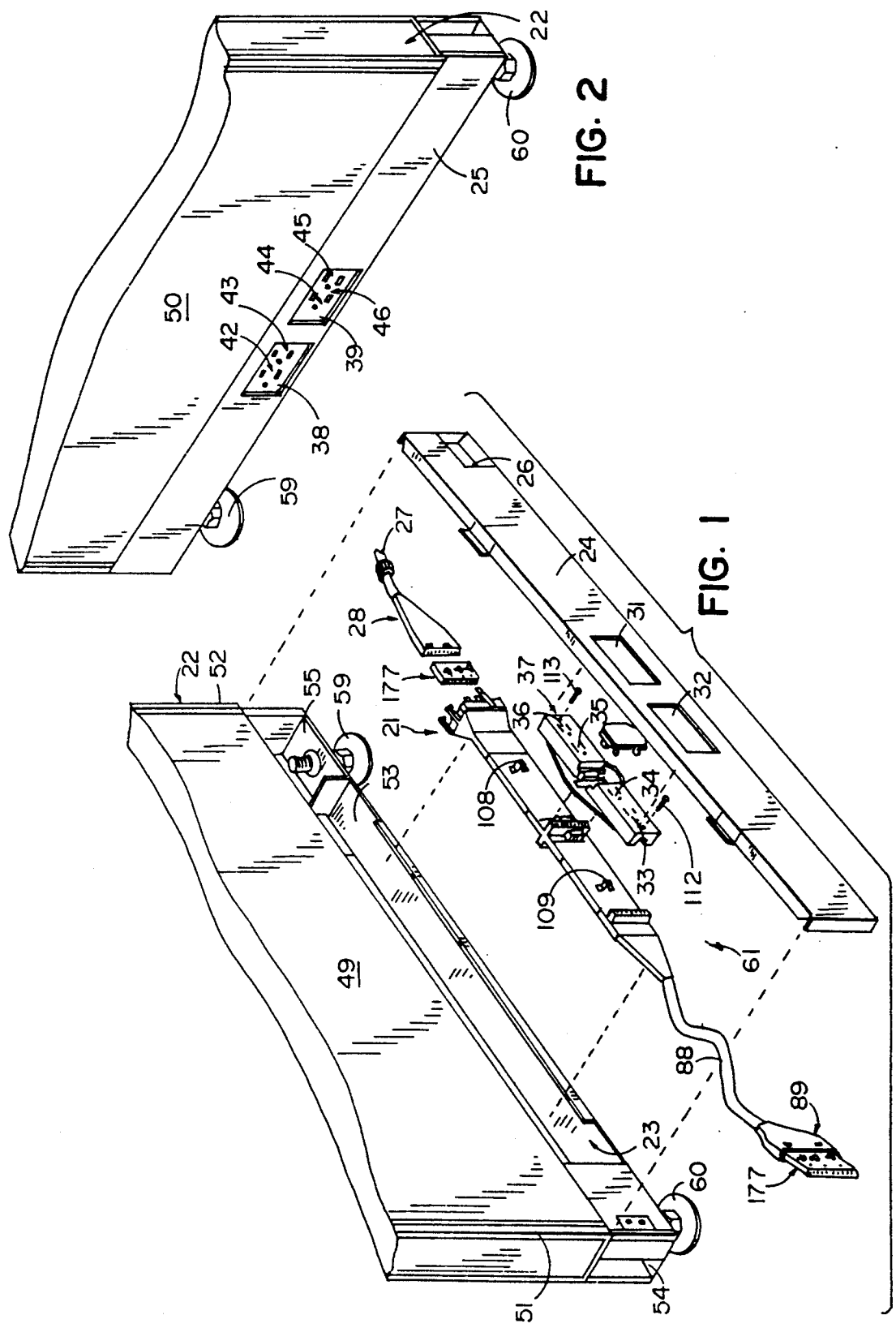

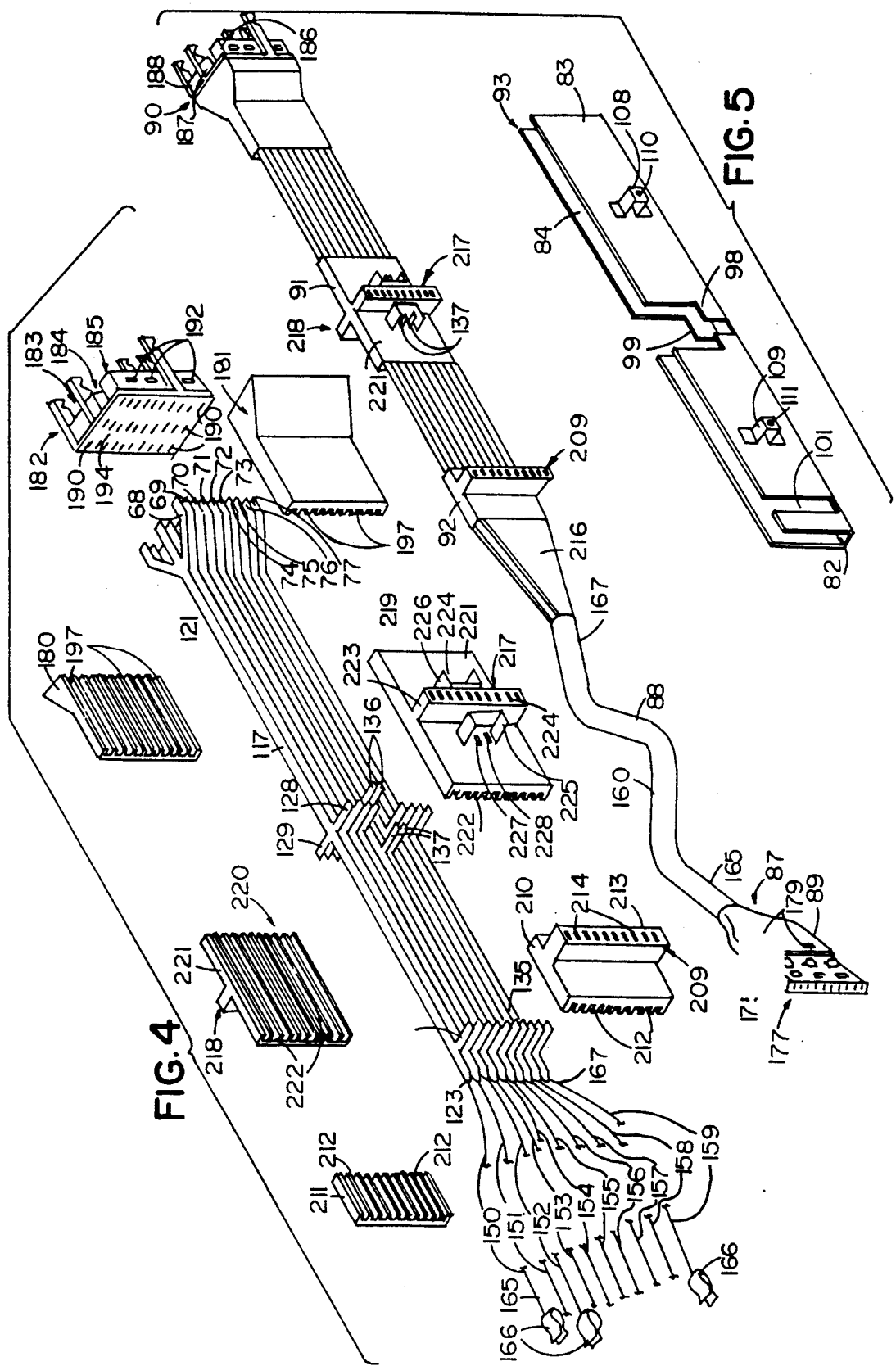

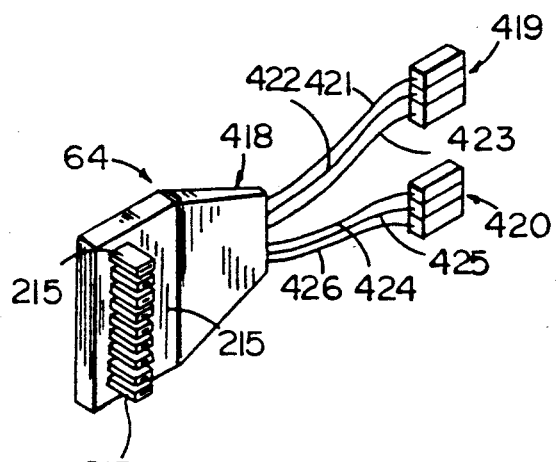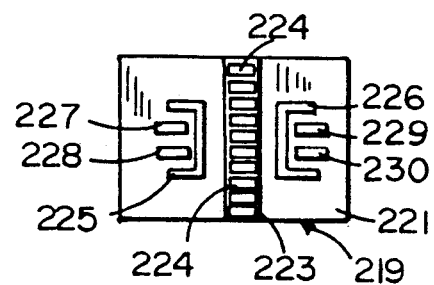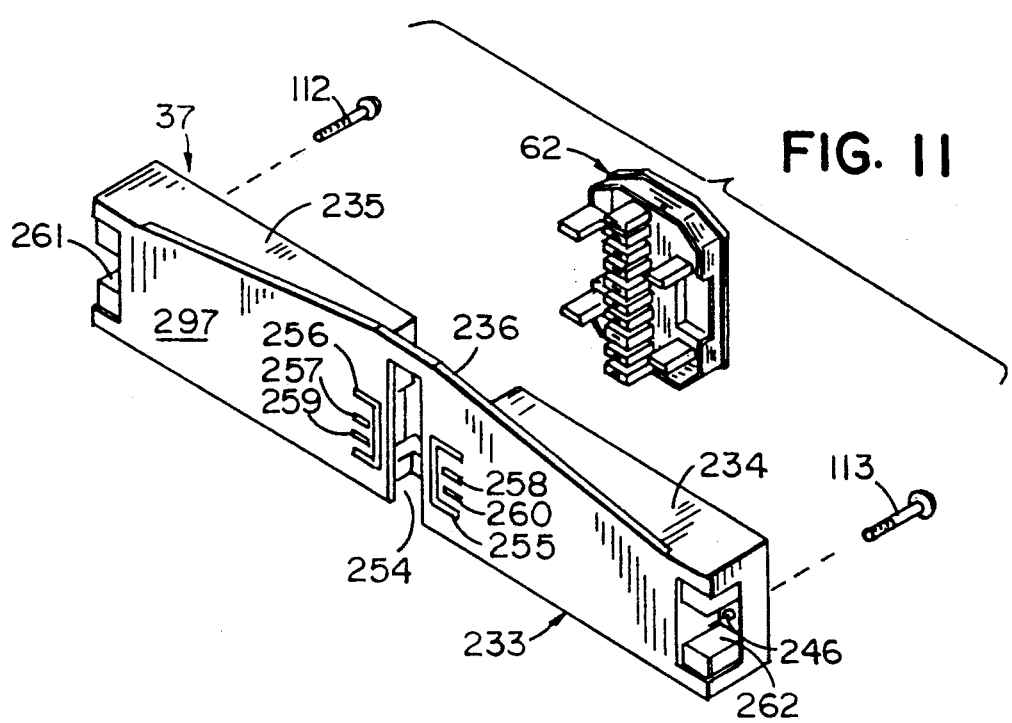

FIG. 28

MODULAR POWERWAY WITH SELECTABLE RECEPTACLE

BACKGROUND OF THE INVENTION

The present invention pertains to the electrification of office furniture and the like, and in particular, to a powerway therefore.

Modular furniture units, such as partition panels, systems furniture and modular furniture, are presently available for office environments. These office arrangements are widely utilized as they are relatively easy to install, convenient to rearrange after installation, attractive in appearance and allow a large number of offices or workstations to be installed in open floor spaces.

These office furniture units preferably include an electrical power distribution system of some type. Such power distribution systems preferably provide electrical power to the various workstations for typewriters, computers, dictating equipment, lights, clocks and other electrical appliances while still retaining flexibility in the arrangement of the furniture units. To facilitate this electrification, many furniture units include a utility raceway associated therewith in which a wiring system is housed.

A wide variety of wiring systems for office furniture units are currently available. These wiring systems employ different techniques and arrangements to conduct electrical power through office furniture units and interconnect adjacent office furniture units. Versatility, durability, electrical integrity, convenience of installation, convenience in rearranging furnished units and overall safety are all important design considerations for these power distribution systems.

It is also desirable to provide a versatile power distribution system which incorporates convenience in connecting power outlets associated therewith to different power supplies It is further desired that such distribution system fit within the limited confines of existing furniture units. Utility raceways of some existing furniture units were originally designed for three-wire power distribution systems. In order for a power distribution system with the versatility and convenience provided by more than three wires to be retrofit in these existing panels, the system must fit within the raceways associated therewith.

A difficulty encountered in installing known power distribution units in utility raceways is inserting a hand into the raceway itself In known systems, an installer must insert a hand to connect the components of the distribution unit. This is difficult and results in a practical inability to install power distribution units in short panels which have insufficient space between the end of the powerway and the panel supports to receive a hand.

SUMMARY OF THE INVENTION

A modular power distribution system for office furniture according to one aspect of the invention includes a powerway having conductors therein. The housing is adapted to be assembled in a utility raceway of the office furniture. An outlet block includes an outlet block housing adapted to be connected with the powerway. A jumper is assembled to the outlet block housing and the powerway housing to connect conductors in the outlet block to the powerway conductors. Different jumpers are used to connect the conductors in the outlet block to different conductors in the power block.

In a modular power distribution system according to another aspect of the invention, the power block includes at least three first connectors on one end of the power block. At least one second connector is carried on the opposite end of the power block Each of the first connectors is adapted to connect with each of the second connectors.

According to yet another aspect of the invention, members of two components in an electric distribution unit include recesses and projections which facilitate interconnection thereof using a flat implement.

The power distribution system provides versatility and convenience of installation and rearrangement and fits in the utility raceway of existing furniture units which were designed originally for three wire power distribution systems. The power distribution system uses a small number of parts to provide a variety of different connections. Accordingly the number of parts which an installer or retailer must carry is minimal. Further, power outlets are readily connected to different power supplies by changing a jumper associated with the outlets or rotating the jumper 180°. The powerway in the power distribution system provide branching which is readily installed in a secure and effective manner to implement a variety of different design configurations without requiring modification of existing utility raceways.

Additionally, components of the power distribution unit can be interconnected using a flat implement. Accordingly, an installer need not insert a hand into a powerway to connect components.

These and other objects, aspects and features of the invention will be more fully understood and appreciated by reference to the written specification and appended drawings.

BRIEF DESCRIPTION OF THE DRAWINGS

FIG. 1 is a fragmentary perspective view of the partition panel and an associated power distribution unit shown in disassembled condition;

FIG. 2 is a fragmentary perspective view of the partition panel according to FIG. 1 from the opposite direction with a power distribution unit assembled therein;

FIG. 4 is an exploded perspective view of a powerway according to FIG. 3;

FIG. 5 is a partially exploded perspective view of a powerway according to FIG. 3;

FIG. 9 is a front perspective view of a light harness for the powerway of FIG. 3;

FIG. 10 is a side elevation of a housing member in the power block of FIG. 4;

FIG. 11 is an exploded, perspective view of an outlet block and jumper of the power distribution unit according to FIG. 3 from another direction;

Figure 28:
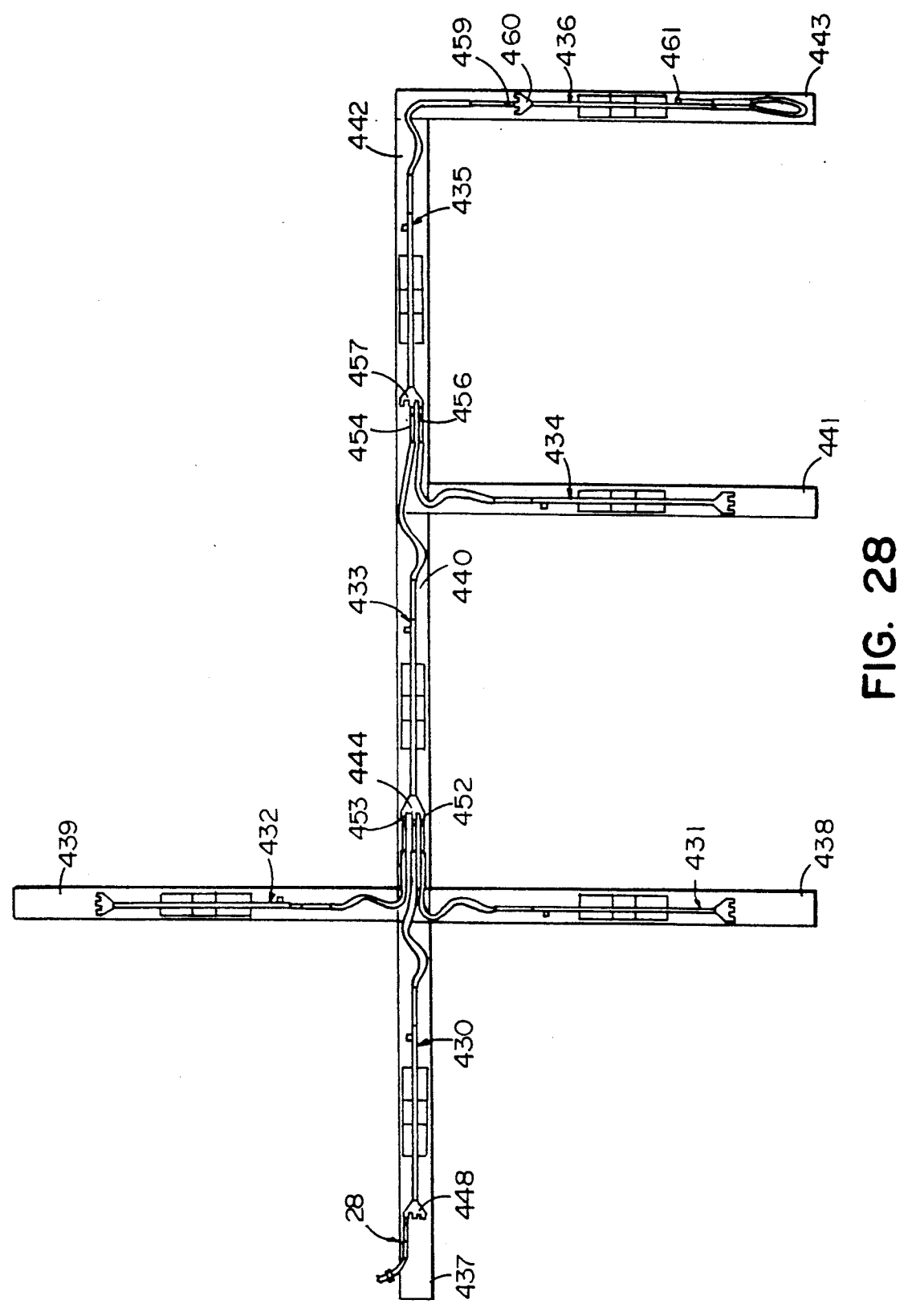

FIG. 28 is a top view of powerways in utility raceways of adjacent joined furniture units;

DESCRIPTION OF THE PREFERRED EMBODIMENT

Figure 3:
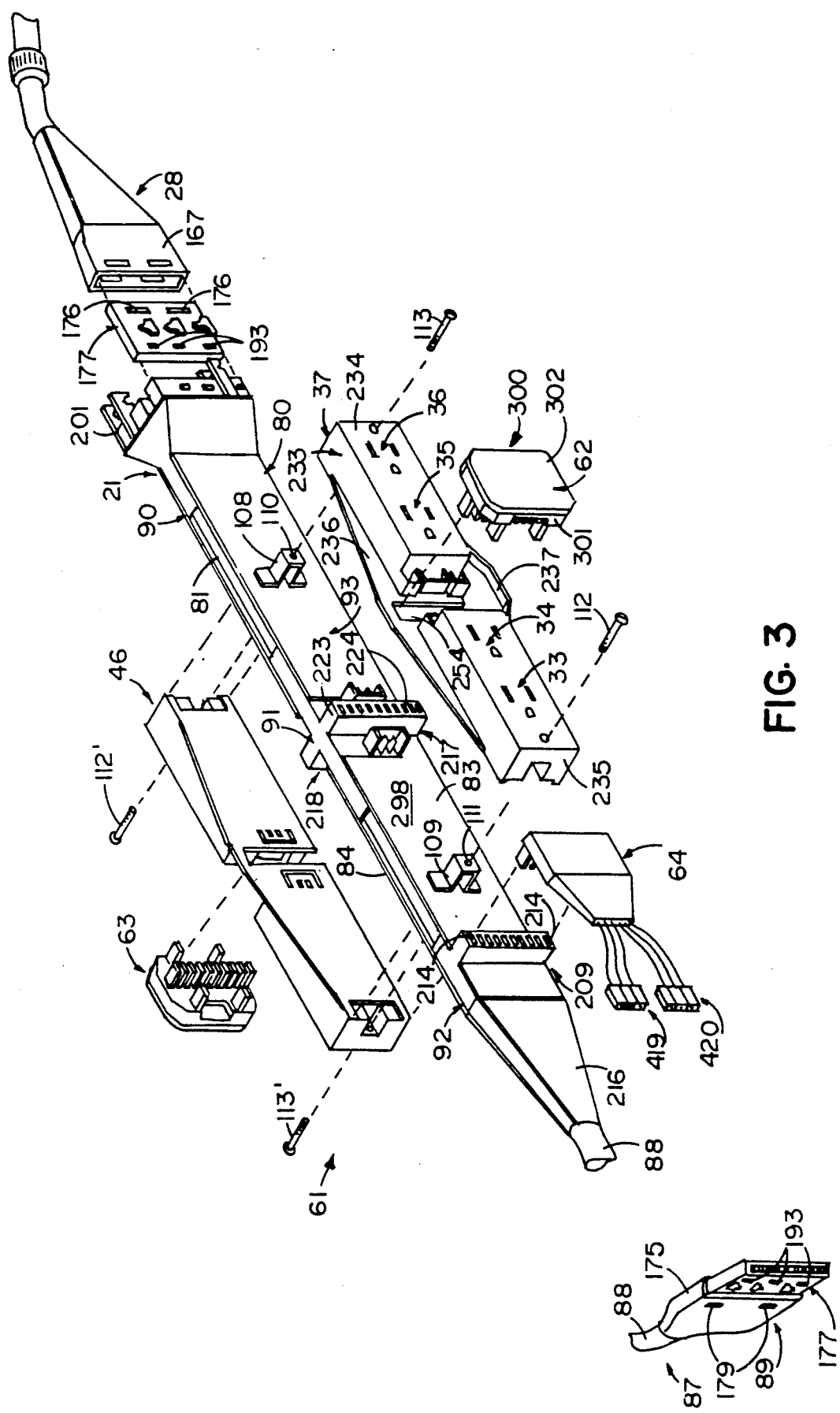
FIG. 3 is an exploded view of the power distribution unit embodying the present invention.

A modular power distribution system according to the illustrated embodiment of the invention includes a powerway 21 (FIG. 1) for use in various types of office furniture. The modular power distribution system is particularly useful in office furniture of the type having a utility raceway. An example of such office furniture is a partition panel 22 (FIGS. 1 and 2) including a utility raceway 23 along a bottom edge thereof. However, the power distribution system according to the present invention can be utilized in utility raceways which extend along the top edge of a partition panel or intermediate the top and bottom edges thereof. The power distribution system can also be utilized with systems furniture, which is often used in conjunction with partition panel systems, and includes work surface wiring arrangements. Modular furniture is also a contemplated application of the powerway. Hence, "office furniture" as used herein, includes all such office furniture arrangements as well as their equivalents. Those skilled in the art will recognize that the power distribution system will also find application in other similar settings and applications.

As illustrated in the drawings, the exemplary partition panel 22 has a conventional construction such as the panel construction disclosed in U.S. Pat. Nos. 4,203,639; 4,308,418; 4,376,561 and 4,429,934, which are incorporated herein by reference. In this example, each partition panel 22 has a utility raceway 23 extending along the bottom edge thereof. A pair of base trim covers 24 (FIG. 1) and 25 (FIG. 2) are connected to panel 22 to enclose raceway 23. Base trim cover 24 may include an opening 26 through which an associated cable 27 of a power tap-in 28 protrudes. Base trim cover 24 also includes openings 31 and 32 through which outlets 33-36 in a outlet block 37 are accessed. Base trim cover 25 similarly includes openings 38 and 39 through which outlets 42-45 of a outlet block 46 (FIG. 3) are accessed. Partition panel 22 preferably includes opposite faces 49 and 50 with end or side trim caps 51 and 52 extending along opposite sides thereof. A base plate 53 extends along the bottom of utility raceway 23 and has its opposite ends connected with supports 54 and 55. A pair of adjustable feet 59 and 60 are mounted in supports 54 and 55 and serve to support partition panel 22 on a floor surface.

A power distribution unit 61 is shaped to be received within utility raceway 23 cf partition panel 22. The illustrated power distribution unit for panel 22 generally includes powerway 21 (FIG. 3), outlet blocks 37 and 46, jumpers 62 and 63, a power tap-in 28, and an optional light harness 64, each of which is described in greater detail hereinafter. Powerway 21 houses bus bar conductors 68-77 (FIG. 4) which provide an electrical bus for powerway 21. Outlet block 37 includes outlet connectors 243-245 and 250-252 (FIG. 13) which include electrical contacts for outlets 33-36. Outlet block 46 (FIG. 3) similarly houses outlet connectors (not shown) which include electrical contacts for outlets 42-45 (FIG. 2). Outlet blocks 37 and 46 are identical. Accordingly, only outlet block 37 is described in greater detail hereinafter. Jumper 62 (FIG. 3) is utilized to electrically connect connectors 243, 245, 250 and 252 in outlet block 37 to selected ones of bus bar conductors 68-71 and 74-77 as described in greater detail hereinafter. Jumper 63 is similarly utilized to electrically connect connectors (not shown) in outlet block 46 to selected ones of bus bar conductors 68-71 and 74-77. A light harness 64 connects a light (not shown), associated with panel 22, to selected ones of bus bar conductors 68-77 in power block 61.

Somewhat more particularly, powerway 21 includes an elongated, generally rectangular, power block housing 80 having a top 81 (FIG. 3), a bottom wall 82 (best shown in FIG. 5) and opposite sidewalls 83 and 84. Housing 80 includes a type-1 connector power block 90, a type-2 connector power block 91, a type-3 connector power block 92, and a housing cover 93. Cover 93 (FIG. 5) includes openings 98, 99 and 101. Openings 98 and 99 receive outwardly extending type-2 connectors of power block 91. Opening 101 receives an outwardly projecting type-3 connector of power block 92. Cover 93 also includes outwardly projecting members 108 and 109 on wall 83. Members 108 and 109 are weldments if the cover is metal or integrally molded with cover 93 if the cover is formed of a molded polymer. Members 108 and 109 may include threaded apertures 110 and 111 for receiving screws 112 and 113 (FIG. 3), respectively. Alternatively, screws 112 and 113 may be self tapping, in which case threaded apertures 110 and 111 are not provided in members 108 and 109. Screws 112 and 113 are used to secure outlet block 37 on powerway 21. In the illustrated embodiment, the top 81 of housing 80 is not closed by housing cover 93 such that conductor 68 is not fully enclosed within housing 80. This facilitates assembly of cover 93 to power blocks 90-92. However, those skilled in the art will recognize that cover 93 may be provided with a top wall pivotally secured to one of sidewalls 83 and 84 such that bus bar conductors 68-77 are fully enclosed. Powerway 21 also includes a flag connector 87 having a cable 88 and a female type-1 connector 89.

Figure 6:
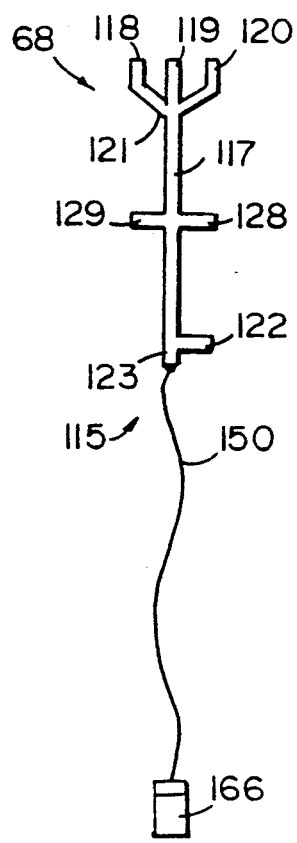
FIG. 6 is a top view of a conductor in the powerway according to FIG. 3.
Figure 7:
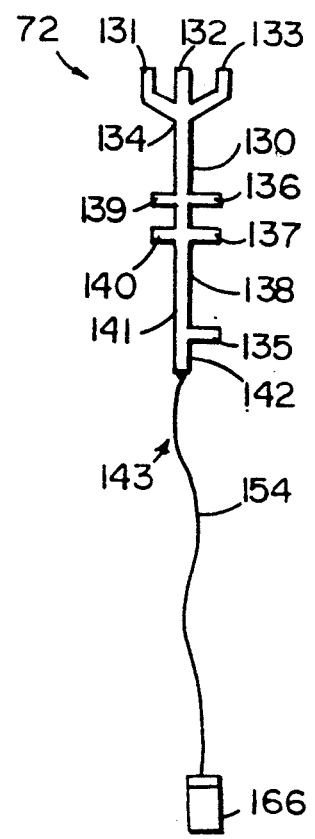
FIG. 7 is a top view of another conductor in the powerway according to FIG. 3.

The electrical conductors of powerway 21 include wires 150-159 (FIG. 4) of cable 88 in addition to bus bar conductors 68-77. FIG. 6 illustrates a power block conductor 115 which includes bus bar conductor 68, wire 150 connected to bus bar conductor 68, and contact 166 connected to wire 150. FIG. 7 illustrates another power block conductor 153, which includes bus bar conductor 72, wire 154 connected to bus bar conductor 72, and contact 166. The ten power block conductors provided by bus bar conductors 68-77, wires 150-159, and contacts 166 thus provide electrical buses throughout the length of powerway 21.

Still more particularly, the illustrated bus bar conductors 68-77 (FIG. 4) are constructed from a suitable electrical conductor, and may for example, be stamped from a suitable metal alloy. The bus bar conductors are supported in substantially rigid housing 80. The ten bus bar conductors 68-77 (FIG. 4) extend in parallel, spaced, relationship, as best illustrated in FIG. 5.

The illustrated bus bar conductors 68-71 and 74-77 are identical. Accordingly, of bus bar conductors 68-71 and 74-77, only bus bar conductor 68 is described in greater detail hereinafter Bus bar conductor 68 includes a body 117 (FIG. 6) which terminates in three spaced, parallel projecting contact blades 118-120 extending from end 121. A male contact blade 122 projects orthogonally from body 117 at end 123. Two male contact blades 128 and 129 project orthogonally opposite sides of body 117 intermediate ends 121 and 123. Bus bar conductor 68 thus includes six male contact blades which are electrically connected.

The illustrated bus bar conductors 72 and 73 are identical. Accordingly, of bus bars 72 and 73, only bus bar conductor 72 is described in greater detail hereinafter. Bus bar conductor 72 includes a body 130. Three spaced male contact blades 131-133, which are identical to blades 118-120 of bus bar conductor 68, project in parallel from an end 134 of body 130. A blade 135 projects orthogonally from body 130. Two male contact blades 136, 137 project orthogonally from edge 138 of body 130 intermediate ends 134 and 142. Two male contacts 139, 140 project orthogonally from edge 141 of body 130 intermediate ends 134 and 142. Bus bar conductor 72 thus includes eight male contact blades which are electrically connected.

Bus bar conductor 68-77 are spaced from one another such that shielding is not required for each bus bar conductor to isolate these conductors. The illustrated bus bar conductors 69-77 are for a short powerway. For long powerways, blade 122 is connected to blades 128 and 129 by a wire (not shown) and blades 128 and 129 are connected to blades 118-120 by a wire (not shown). For long powerways, blade 135 is connected to a connector (not shown) including blades 136, 137, 139 and 140 by a wire (not shown) and the connector including blades 136, 137, 139 and 140 is connected to blades 131-133 by another wire (not shown).

Those skilled in the art will recognize that the ten bus bar conductors 68-77 in power block 61 may be connected to a variety of different circuits through power tap-in 28 (FIG. 3). For example, the conductors may be connected to voice and data communication circuits, 110-volt power supplies, 220-volt power supplies, or the like. In the illustrated embodiment of the invention, the ten bus bar conductors 68-77 (FIG. 4) are connected to four 110-volt power sources, safety ground (SG) and isolated ground (IG). Somewhat more particularly, in the illustrated embodiment of the invention, conductors 68 and 69 are connected to a live conductor (L1) and a neutral conductor (N1) of a first power supply. Conductors 70 and 71 are connected to a live conductor (L2) and a neutral conductor (N2) of a second power supply. Conductors 72 and 73 are connected to safety ground and isolated ground, respectively. Bus bar conductors 74 and 75 are connected to a live conductor (L3) and a neutral conductor (N3) of a third power supply. Conductors 76 and 77 are connected to a live conductor (L4) and a neutral conductor (N4) of a fourth supply. Those skilled in the art will recognize that the total number of outlets which can be connected to a single power supply is limited. If too many outlets are connected to a single power supply, the power supply may be overloaded causing interruption of power. The illustrated bus bars are connected to draw power from four power supplies, isolated ground and safety ground. The powerway is thus part of a system having a large outlet capacity.

Cable 88 (FIG. 5) includes ten wires 150-159 (FIG. 4) partially enclosed within a sheath 160. These ten wires are connected at end 165 to female contacts 166 (only some of which are illustrated). A respective contact 166 is connected to each one of wires 150-159 by any suitable means such as welding. Wires 150-159 are also connected at end 167 to bus bar conductors 68-77. Wires 150-159 are connected to bus bar conductors 69-77 using any suitable means such as welding.

Figure 8:
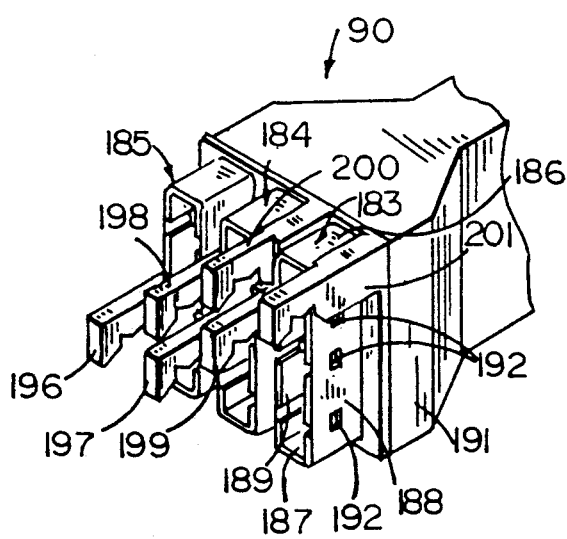
FIG. 8 is fragmentary perspective view of a powerway according to FIG. 3 taken from another direction.

Contacts 166 are mounted within a housing 175 (FIG. 5; of male Type-1 connector 89 as best illustrated in FIG. 8. Connector 89 is identical to power tap-in 28 type-1 connector 167 (FIG. 3). For brevity, only connector 89 is described hereinafter. Connector 89 includes a housing 175 having conventional female electrical contacts 166 mounted therein. Contacts 166 are supported in housing 175 by means (not shown) such as conventional snap connectors, an adhesive, threaded fasteners, or the like. Housing 175 is connected to cable 88 by any suitable means such as a fastener (not shown). Housing 175 includes apertures 179 (FIGS. 3 and 5) which receive projections 176 of an intermediate connector 177. Housing 175 is constructed of any suitable dielectric material such as an integrally molded organic polymer.

Housing 80 enclosing bus bar conductors 68-77 includes type-1 connector power block 90 as described briefly above. Power block 90 (FIG. 5) includes three housing sections 180-182 (FIG. 4). Housing sections 180-182 are constructed of any suitable dielectric material such as a molded organic polymer. The housing sections are interconnected by any suitable construction (not shown) such as by conventional snap connectors, ultrasonic welding, cold staking, threaded fasteners, an adhesive, or the like. Housing sections 181 and 182 of power block 90 each include ten parallel channels 197 (only some of which are numbered), each channel receiving a respective one of bus bar conductors 68-77.

Figure 8A:
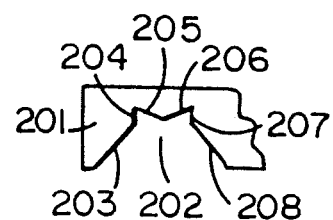
FIG. 8a is a fragmentary side elevational view of an arm of the powerway according to FIG. 8.

Housing section 182 includes three female type-1 connectors 183-185 (best shown in FIG. 8) on an end wall 191. Connectors 183-185 are identical, and accordingly only connector 183 is described in greater detail hereinafter. Connector 183 (FIG. 9) includes a top wall 186, a bottom wall 187 and opposite sidewalls 188 and 189 which define the perimeter of the generally rectangular male connector. Side walls 188 and 189 each include three apertures 192 which receive projections 193 (FIG. 3) on intermediate connector 177 Housing section 182 includes arms 196-201 (FIG. 8) extending substantially orthogonally from end wall 191. Arms 196-201 are integrally formed with end wall 191 and at least one sidewall of connectors 183-185 to provide a stable support for the arms. Each of the arms is identical and includes a recess 202 (FIG. 8a). Recess 202 includes six sides 203-208 which are spaced from end wall 191. Housing section 182 (FIG. 4) also includes three columns of ten vertically arranged openings 190 (only some of which are numbered) in a back wall 194. Openings 190 receive respective blades 118, 119, 120 131, 132 and 133 of bus bar conductors 68-77. The female type-1 connector provided by each of connectors 183, 184 and 185 includes a male contact blade of each of the bus bar conductors 68-77. The three type-1 connectors provided by power block 90 accordingly provide branching by allowing three male type-1 connectors to be electrically interconnected by bus bar conductors 68-77.

Type-3 connector power block 92 (FIG. 5) provides a single type-3 connector 209. Power block 92 includes housing sections 210 and 211 (FIG. 4) of any suitable dielectric material construction such as a molded polymeric material. Housing sections 210 and 211 are interconnected by any suitable means (not shown) such as conventional snap connectors, threaded fasteners, adhesive or the like. Housing sections 210 and 211 include channels 212 (some of which are numbered) which receive and support bus bar conductors 68-77. Housing section 210 of power block 92 includes an outwardly projecting female receptacle block 213 including ten vertically arranged openings 214 (only some of which are numbered) each of which houses a respective male contact blade 122 or 135 of bus bar conductors 68-77. Each opening 214 is adapted to receive a respective silo 215 (FIG. 9) of light harness 64. Housing sections 210 and 211 also enclose the connection of conductors 150-159 (FIG. 4) and bus bar conductors 68-77. A shield 216 (FIG. 3) extends between power block 92 and sheath 88 to enclose conductors 150-159 (FIG. 4). Shield 216 is of any suitable construction such as a flexible polymeric or metal member wrapped around conductors 150-159. Shield 216 is attached to power block 92 by any suitable means (not shown) such as by conventional fasteners, overmolding, adhesive, or the like.

Type-2 power block 91 (FIG. 5) provides two type-2 connectors 217 and 218 (FIGS. 3 and 4). Power block 91 includes two housing sections 219 (FIG. 4) and 220 forming a generally rectangular base 221 (FIG. 5). Housing sections 219 and 220 are of any suitable construction such as a molded polymeric material. Housing sections 219 and 220 are interconnected by any suitable means (not shown) such as snap connectors, threaded fasteners, adhesive, or the like. Housing sections 219 and 220 also include channels 222 (only some of which are numbered) which receive and support bus bar conductors 68-77. Housing sections 219 and 220, and the type-2 connectors 217 and 218 provided on housing sections 219 and 220, respectively, are identical. Accordingly, only housing section 219 is described in greater detail hereinafter. Housing section 219 includes a generally rectangular connector block 223 projecting from base 221. Connector block 223 includes openings 224 (FIG. 10). Each one of the openings 224 houses a blade 128 (FIG. 4) of a respective one of bus bar conductors 68-71 and 74-77. Housing section 219 also includes U-shaped blade guards 225 (FIG. 10) and 226 which project orthogonally from base 221. Blade guard 225, blade guard 226 and connector block 223 are preferably integrally molded with base 221. Power block 91 also includes openings 227-230 (FIG. 10) which receive blades 136 and 137 of bus bar conductors 72 and 73.

Outlet blocks 37 (FIG. 3) and 46 are mounted to powerway 21 to provide power supply outlets 33-36 and 42-45 (FIG. 2) with power from bus bars 68-77. Outlet blocks 37 and 46 are identical, and accordingly only outlet block 37 is described in greater detail hereinafter. Outlet block 37 includes an elongated base 233 (FIG. 3). Base 233 includes two generally rectangular contact housings 234 and 235. A web 236 and an arm 237 join housings 234 and 235 and support housings 234 and 235 such that base 233 is rigid. Contact housings 234 and 235, web 236, and arm 237 are formed of any suitable dielectric material. In a preferred embodiment of the invention, base 233 is an integrally molded organic polymer.

Figure 12:
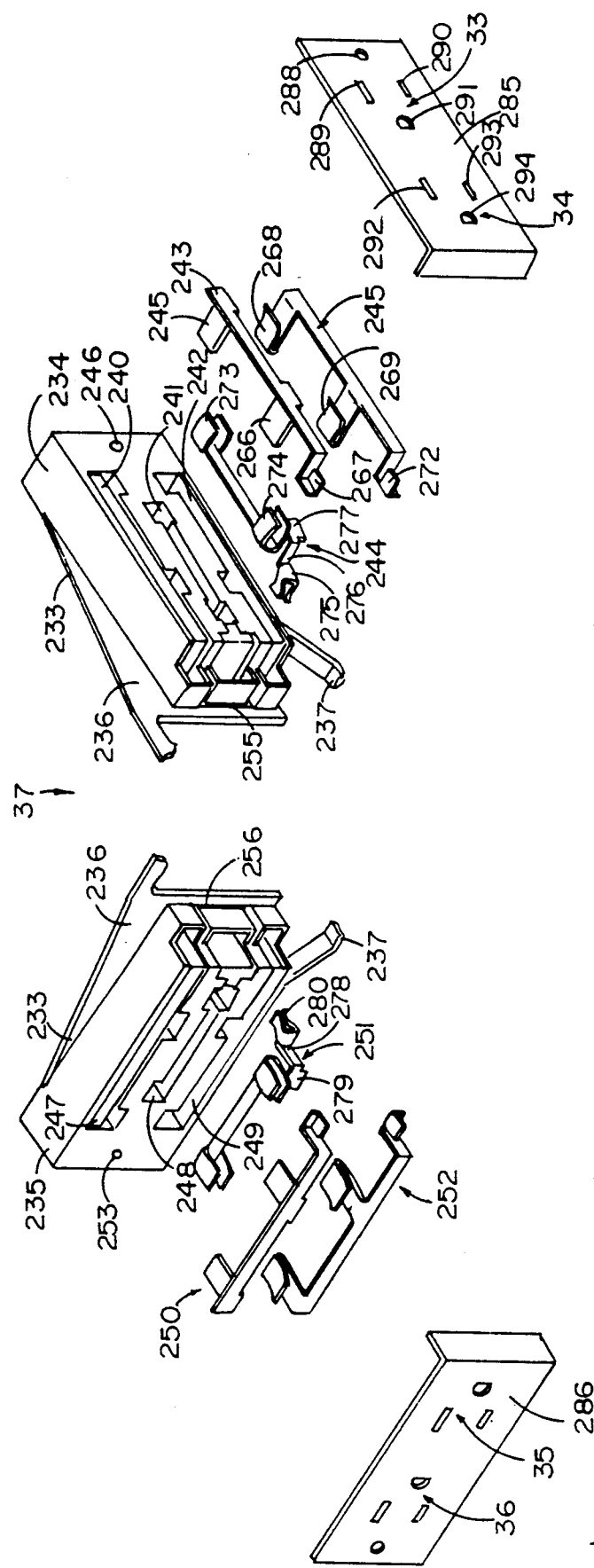
FIG. 12 is an exploded, broken perspective view of an outlet block according to FIG. 3.

Contact housing 234 includes channels 240-242 (FIG. 12) which receive respective connectors 243-245. Contact housing 234 also includes a cylindrical passage 246 receiving screw 112 (FIG. 3). Contact housing 235 (FIG. 12) includes channels 247-249 which receive respective connectors 250-252. Contact housing 235 also includes a cylindrical passage 253 receiving screw 113 (FIG. 3). Web 236, joining contact housings 234 and 235, includes a central rectangular opening 254 (FIG. 11) receiving outwardly projecting female receptacle block 217 of type-2 connector 211. Outlet block 37 also includes U-shaped openings 255 and 256 (FIG. 11). Openings 255 and 256 receive blade guards 225 (FIG. 10) and 226 when the outlet block 37 is assembled to power block 61. Outlet block 37 also includes openings 257-260 (FIG. 11) which receive respective ones of blades 136 (FIG. 4) and 137 of bus bar conductors 72 and 73. Recesses 261 and 262 (FIG. 11) are provided on opposite ends of outlet block 37 to receive members 108 and 109 of cover 93.

Connectors 243-245 (FIG. 12) and 250-252 provide electrical contacts for outlet block 37. Connectors 243 and 252 are substantially similar. Connectors 244 and 251 are substantially similar. Connectors 245 and 252 are also substantially similar. Only connectors 243, 244, 245, and 251 are described in greater detail hereinafter. Connector 243 includes two female contacts 265 and 266 for connection with blade contacts (not shown) of conventional electrical plugs (not shown) of the type used to connect electric appliances, lamps, calculators or the like to a power outlet. Connector 243 also includes an upwardly projecting blade contact 267 for connection with a contact in jumper 62. Connector 245 includes two female blade contacts 268 and 269 for connection with the blades (not shown) of a conventional electrical plug (not shown). Connector 245 also includes an upwardly projecting male contact 272 for connection with a female connector on jumper 62. Connector 244 includes two upwardly projecting female contacts 273 and 274 for connection with the safety ground blade (not shown) of a conventional three-prong plug (not shown) inserted into outlets 33 and 34. Connector 244 also includes a downwardly projecting female contact 275 for connection with a safety ground blade 136 (FIG. 7) of bus bar conductor 72.

Although connectors 244 and 251 are substantially similar, they differ in the following respect. Connector 244 includes contact 275 on an arm 276 extending from body 277. Connector 251 includes a contact 280 on an arm 278 extending from body 279. However, arms 276 and 278 extend from opposite sides of bodies 277 and 279, respectively. Since body 277 is positioned between blades 137 of bus bars 72 and 73, and body 279 is positioned between blades 139 of bus bars 72 and 73, contacts 275 and 280 connect with safety ground conductor 72. However, if connectors 244 and connector 251 are interchanged, contacts 275 and 280 connect with isolated ground conductor 73. Thus, the outlets in outlet blocks 37 and 46 can be connected to safety ground or isolated ground using connectors 244 and 251. It will be recognized that using connector 244 or connector 251 for both outlet pairs 33, 34 and 35, 36, one pair of outlets is connected to isolated ground and the other pair of outlets is connected to safety ground.

Connectors 243-245 are secured in contact housing 234 by a cover 285. Connectors 250-252 are similarly secured within contact housing 235 by a cover 286. In the embodiment illustrated in FIG. 13, covers 285 and 286 are identical. As illustrated in FIGS. 1-3, the covers are not the same. Those skilled in the art will recognize that different covers may be used. However, different covers as illustrated in FIGS. 1 and 3 would require that different contacts be used in the two contact housings. Accordingly, the embodiment of FIG. 13 using identical covers is preferred since it minimizes the number of different parts used in the system thereby reducing the production costs of the system. For brevity only cover 285 is described in greater detail hereinafter. Cover 285 is secured to contact housing 234 using any suitable means (not shown) such as snap connectors, an adhesive, threaded fasteners, or the like. Cover 285 includes openings 288-294. Openings 289-291 provide access to contacts 265, 268 and 273, respectively, of outlet 33. Openings 292-294 provide access to contacts 266, 269 and 274, respectively, of outlet 34. Opening 288 receives screw 112 which secures outlet block 37 to power block 61.

Figure 13:
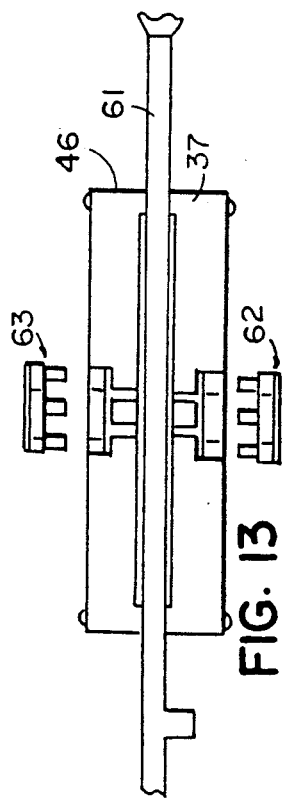
FIG. 13 is a partially exploded top view of a powerway, receptacle blocks, and jumper according to FIG. 3.

To connect outlet block 37 to power block 61, connector 224 (FIG. 3) is received through opening 254 (FIG. 11), blade guard 225 (FIG. 10) is received through opening 255, blade guard 226 is received through opening 256 (FIG. 9), and members 108 and 109 are received in recesses 261 (FIG. 11) and 262, respectively. Blades 136 and 137 of conductors 72 and 73 are inserted through openings 257-260. Blades 136 and 137 of conductor 72 engage contacts 275 (FIG. 12) and 280 of connectors 244 and 251 when the back surface 297 (FIG. 11) of outlet block 37 is positioned flush against surface 298 (FIG. 3) of powerway 21. Screws 112 and 113 are screwed into threaded apertures 110 and 111 of members 108 and 109, respectively, to secure outlet block 37 to powerway 21. Alternatively, outlet block 37 can be attached to powerway 21 using other means (not shown) such as snap connectors, clips, an adhesive or the like. Outlet block 46 (FIG. 3) is assembled to powerway 21 in the same manner using screws 112' and 113'. Outlet blocks 37 and 46 are thus supported on powerway 21 as illustrated in FIG. 13.

Figure 14:
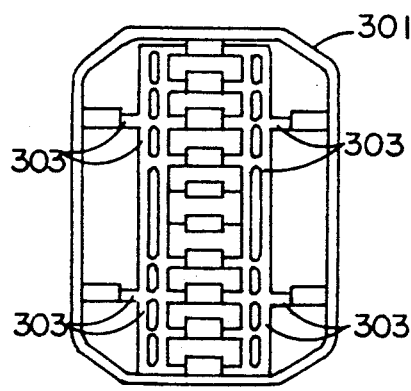
FIG. 14 is a back elevational view of a base housing of a jumper in the power distribution unit of FIG. 3.
Figure 15:
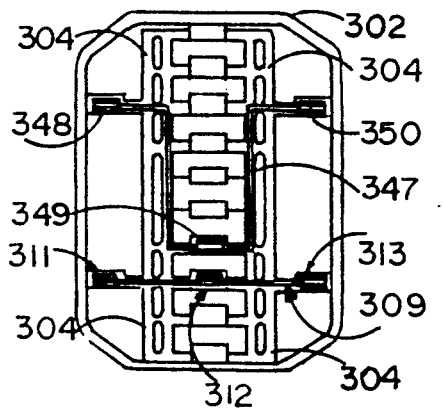
FIG. 15 is a front elevational view of a jumper cover including connectors providing one electrical connection between the receptacle and the powerway of FIG. 3.
Figure 16:
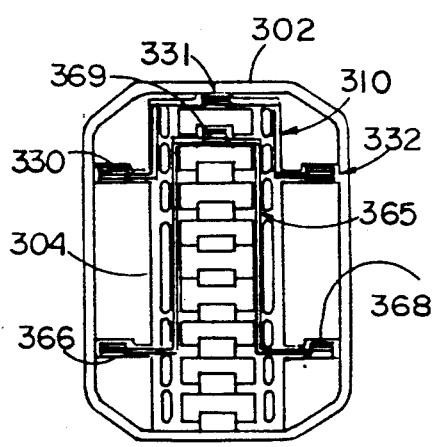
FIG. 16 is a front elevational view of a jumper cover including connectors providing a second electrical connection between the receptacle and the powerway in FIG. 3.
Figure 17:
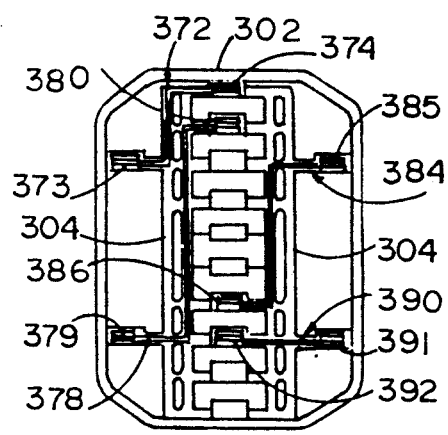
FIG. 17 is a front elevational view of a jumper cover including connectors providing a third electrical connection between the receptacle and the power block of the powerway of FIG. 3.

Jumper 62 (FIG. 3) is utilized to connect connectors 243-245 (FIG. 12) and 250-252 with selected bus bar conductors 68-77 (FIG. 4) as described briefly above. The jumper includes a housing 300 having a jumper base 301 (FIG. 3) and a jumper cover 302. The base and cover of jumper housing 300 are of any suitable construction such as an integrally molded organic polymer. Jumper base 301 includes a channel 303 (FIG. 14) and jumper cover 302 includes a channel 304 (FIGS. 15-17). Channels 303 and 304 are mirror images of one another for receiving and securing selected jumper conductors in jumper housing 300. The jumper base 301 and jumper cover 302 are interconnected by any suitable means (not shown) such as snap connectors, adhesive, threaded fasteners, or the like.

Figure 18:
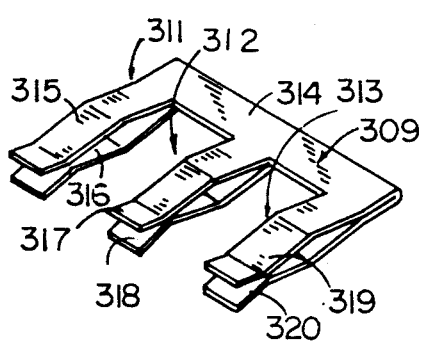
FIG. 18 is a perspective view of a connector used in the jumper of the powerway according to FIG. 3.
Figure 19:
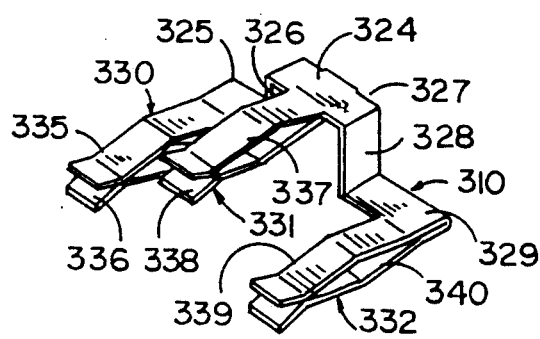
FIG. 19 is a perspective view of another connector used in the jumper of the powerway according to FIG. 3.

Jumper connectors 309 (FIG. 18) and 310 (FIG. 19) are provided for illustrative purposes. Those of ordinary skill in the art will recognize from the examples provided hereinbelow that a variety of different jumper connectors are utilized to selectively connect the outlet block connectors 243-245 and 250-252 with different bus bar conductors in the power block. Connector 309 (FIG. 18) includes three female contacts 311-313 projecting from a straight shoulder 314. Contact 311 includes resilient arms 315 and 316 which project outwardly from shoulder 314. Contact 312 includes resilient arms 317 and 318 extending orthogonally from shoulder 314. Contact 313 includes resilient arms 319 and 320 extending orthogonally from shoulder 314. Jumper connector 309 is formed of any suitable construction such as stamped from a suitable conductive metal alloy.

Jumper connector 310 (FIG. 19) includes a shoulder 324 having five integral sections 325-329 and contacts 330-332. Sections 325 and 329 are substantially coplanar. Section 327 is spaced from sections 325 and 329 and extends parallel thereto. Sections 325 and 327 are joined by orthogonally extending section 326. Sections 327 and 329 are joined by orthogonally extending section 328. Contact 330 includes resilient arms 335 and 336 projecting orthogonally from section 325. Contact 331 includes resilient arms 337 and 338 projecting orthogonally from section 327. Contact 332 includes resilient arms 339 and 340 projecting orthogonally from section 329. Sections 326 and 328 are of sufficient length to position contact 331 to engage blade 128 of bus bar conductor 68. Those skilled in the art will recognize that by varying the length of sections 326 and 328, contact 331 is positioned to connect with a different one of bus bar conductors 68-77 in powerway 21. Jumper connector 300 is formed of any suitable construction such as stamped from a suitable conductive metal alloy.

To electrically connect connectors 243-245 (FIG. 12) in the outlet block 37 to selected one of bus bar conductors 68-71 (FIG. 4) and 74-77 in powerway 21, an installer selects a jumper 62 having contacts assembled therein which provide a desired electrical connection. The selected plug includes contacts assembled in channel 304 (FIG. 15) of cover 302. The selected jumper is then assembled to powerway 21 and outlet block 37. Jumper 63 (FIG. 3) similarly connects connectors in outlet block 46 to selected ones of bus bar conductors 68–71 and 74–77 of powerway 21.

Various jumper connectors in jumper housing cover 302 are illustrated in FIGS. 15–18. Connector 309 is illustrated in channel 304 of cover 302 in FIG. 15. A connector 347 is also illustrated in channel 304. Connector 347 includes contacts 348–350 which are identical to contacts 311–313 and contacts 330–332. The jumper illustrated in FIG. 15 makes the following connections when connected to powerway 21 and outlet block 37 in a first orientation: contact 313 connects with connector 252; contact 312 connects with contact blade 128 of bus bar conductor 75; contact 311 connects with connector 245; contact 350 connects with connector 250 contact 349 connects with blade 128 of bus bar conductor 74; and contact 348 connects with blade 267 of connector 243 in contact housing 234. Thus, in the first orientation the jumper illustrated in FIG. 15 connects outlets 33–36 with power supply conductor 73 (L3) and neutral conductor 74 (N3) of the third power supply. By assembling jumper of FIG. 15 to powerway 21 and outlet block 37 at a second orientation, rotated 180° with respect to the first orientation, the following connections are made: contact 313 connects to connector 243; contact 312 connects to bus-bar conductor 71; contact 311 connects to connector 250; contact 350 connects to connector 245; contact 349 connects to bus-bar conductor 70; and contact 348 connects to connector 252. Thus, in the second orientation, the jumper illustrated in FIG. 15 connects outlets 33–36 with power supply conductors 70 (L2) and 71 (N2) coupled to the second power supply.

Another jumper is illustrated in FIG. 16. The jumper of FIG. 16 includes connector 310 assembled in channel 304 and a connector 365 assembled in channel 304. Connector 365 includes contacts 366–368 which are identical to contacts 311–313 and contacts 330–332. The jumper illustrated in FIG. 16, makes the following connections when it is connected to power block 61 and outlet block 37 in a first orientation: contact 332 connects with connector 252 (FIG. 12); contact 331 connects with bus bar conductor 68; contact 330 connects with connector 245; contact 368 connects with connector 250; contact 367 connects with bus bar conductor 69; and contact 366 connects with contact blade 267 of connector 243 in contact housing 234. Thus, in the first orientation, the jumper illustrated in FIG. 16 connects outlets 33–36 with power supply conductor 68 (L3) and neutral conductor 69 (N3) coupled to the first power supply source. By assembling the jumper of FIG. 16 to powerway 21 and outlet block 37 at a second orientation rotated 180° with respect to the first orientation, the following connections are made: contact 332 connects with connector 243 (FIG. 12); contact 331 connects with bus-bar 77 (FIG. 4); contact 330 connects with connector 250; contact 368 connects with connector 245; contact 367 connects with bus-bar 76; and contact 366 connects with connector 252. Thus, in the second orientation, the jumper illustrated in FIG. 16 connects outlets 33–36 with power supply conductors 75 and 76.

A third jumper housing connection is illustrated in FIG. 17. As illustrated in FIG. 17, four connectors 372, 378, 384, and 390 are utilized to connect connectors 243, 245, 250 and 252 to respective conductors in the power block. Connector 372 includes contacts 373 and 374. Connector 378 includes contacts 379 and 380. Connector 384 includes contacts 385 and 386. Connector 390 includes contacts 391 and 392. Contacts 373, 374, 379, 380, 385, 386, 391 and 392 are identical to contacts 311–313 and contacts 330–332. When the jumper illustrated in FIG. 17 is connected to power block 61 and outlet block 37 in a first orientation the following connections are made: contact 373 connects with connector 243; contact 374 connects with bus bar conductor 68; contact 379 connects with connector 245; contact 380 connects with bus bar conductor 69; contact 385 connects with connector 250; contact 386 connects with bus bar conductor 74; contact 391 connects with connector 252; and contact 392 connects with bus bar conductor 75. Thus, the illustrated jumper of FIG. 17 connects outlets 33 and 34 with power supply conductor 68 (L3) and neutral conductor 69 (N3) coupled to the first power supply source. Thus, when connected at a first orientation the jumper of FIG. 17 connects outlets 35 and 36 with power supply conductor 74 (L3) and neutral conductor 75 (N3) coupled to the third power supply source. By rotating the jumper of FIG. 17 180 to a second orientation when the jumper is assembled to powerway 21 and outlet block 37, the following connections are made: contact 373 connects with connector 252; contact 374 connects with bus bar 77; contact 379 connects with connector 250; contact 380 connects with bus bar 76; contact 385 connects with connector 245; contact 386 connects with bus bar 71; contact 391 connects with connector 243; and contact 392 connects with bus-bar 70. The jumper illustrated in FIG. 17 thus connects outlets 33 and 34 to power supply conductors 70 (L2) and 71 (N2) and outlets 35 and 36 to power supply conductors 76 (L4) and 77 (N4) in the second orientation. It will be understood that jumpers with other connectors are similarly used to connect outlets 33–36 to different power supplies.

Figure 20:
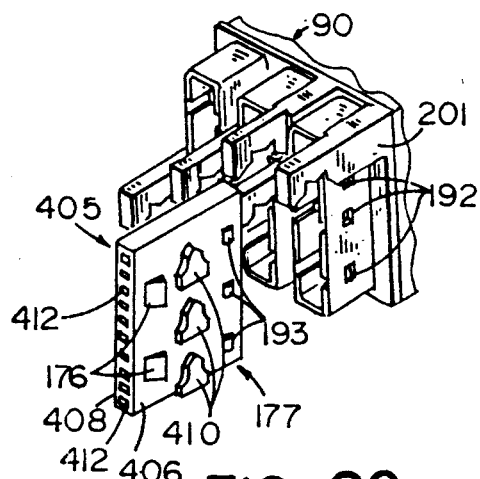
FIG. 20 is a fragmentary, exploded view of a powerway and intermediate connector according to FIG. 3 taken from another direction.
Figure 21:
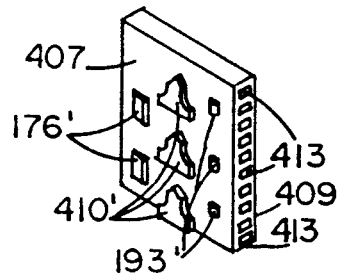
FIG. 21 is a side perspective view of the intermediate connector according to FIG. 20 taken from another direction.
Figure 22:
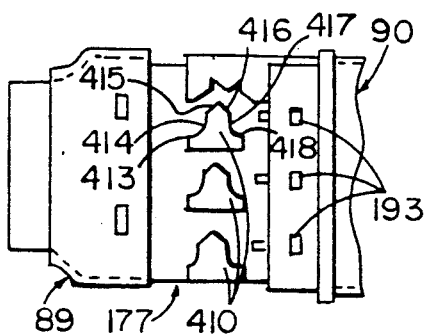
FIG. 22 is a fragmentary side elevational view of a powerway, connected intermediate connector, and connector according to FIG. 1.

In the illustrated embodiment, an intermediate connector 177 (FIG. 3) connects connector 89 to power block 90. Intermediate connector 177 includes a generally rectangular housing 405 (FIG. 20). Housing 405 includes side walls 406 (FIG. 20) and 407 (FIG. 21) and end walls 40 (FIG. 20) and 409 (FIG. 21). Side walls 406 and 407 are identical. Side wall 406 includes projections 176 for insertion into apertures 179 (FIGS. 3 and 5) of housing 175. Side wall 406 also includes projections 193 (FIG. 20) for insertion into apertures 192 of power block 90. Attachment projections 410 are provided intermediate projections 176 and 193. Attachment projections 410 include sides 411–418 (FIG. 22). End wall 408 includes ten openings 412 (only some of which are numbered) in which conventional male contacts (not shown) for mating with contact 166 (FIG. 4) are positioned. End wall 409 includes ten opening 413 (FIG. 21, only some of which are numbered) in which conventional female contacts (not shown) for mating with blades of bus bars 68–77 are positioned. Openings 412–413 are interconnected by channels (not shown). Electrical conductors (not shown) connect the contacts positioned in openings 412 and 413.

Figure 23:
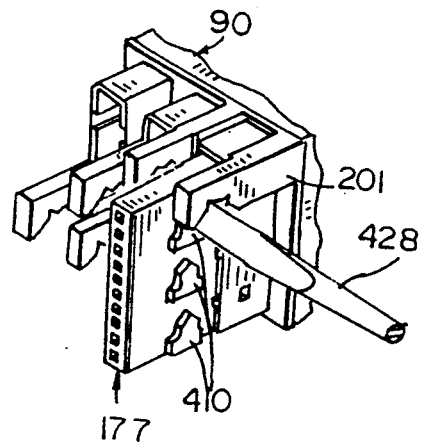
FIG. 23 is a fragmentary, perspective view of a powerway and a disconnected intermediate connector according to FIG. 20 and a flat implement.
Figure 24:
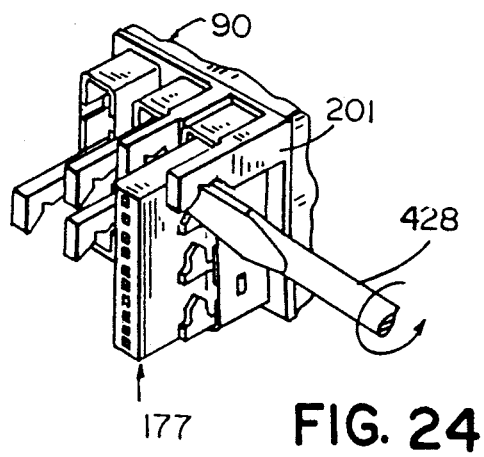
FIG. 24 is a fragmentary, perspective view of a powerway, intermediate connector, and rotating flat implement according to FIG. 23.
Figure 25:
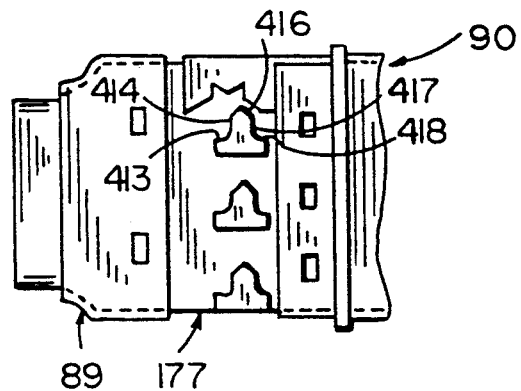
FIG. 25 is a fragmentary side elevational view of a powerway, disconnected intermediate connector, and connector according to FIG. 1.

To connect connector 89 (FIG. 3) to power block 90, connector 89 is assembled to intermediate connector 177 as illustrated in FIG. 3. Intermediate connector 177 is placed adjacent power block 90 such that the attachment projection 410 is positioned behind recess 207 as illustrated in FIG. 22. An installer inserts a flat implement 428 (FIG. 23) such as a screw driver, a blade or the like, between side 208 (FIG. 8a) of recess 202 and side 415 of attachment projection 410. Upon rotation of the flat implement as illustrated in FIG. 24, projections 193 of intermediate connector 177 are driven into recesses 192 of power block 90 as illustrated in FIG. 25. Implement 428 pivots to a position against walls 414 and 413 of attachment projection 406 and side 207 of recess 202. Side 413 prevents implement 428 from sliding downwardly when the implement is rotated.

Figure 26:
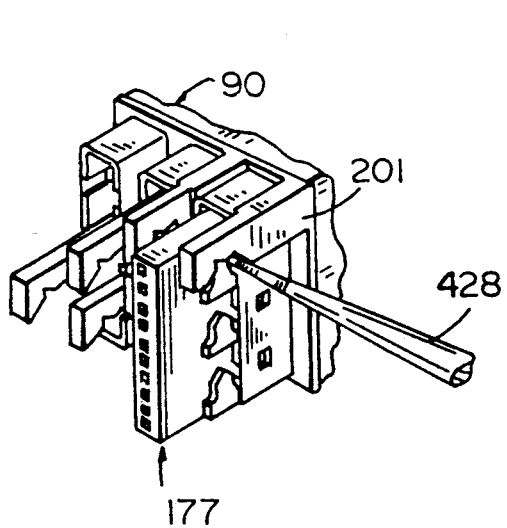
FIG. 26 is a fragmentary, perspective view of a powerway and connected intermediate connector according to FIG. 20 and a flat implement.
Figure 27:
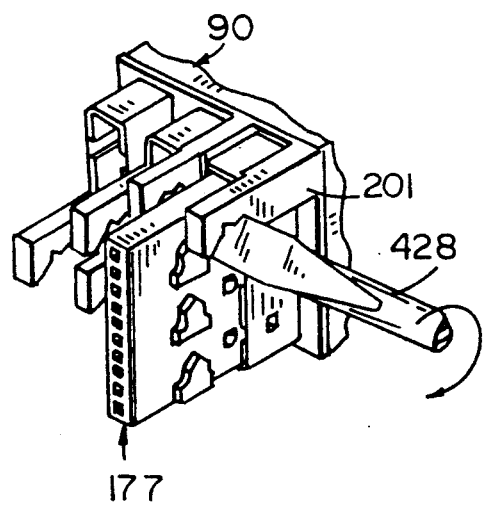
FIG. 27 is a fragmentary, perspective view of a powerway, intermediate connector, and rotating flat implement according to FIG. 26.
Figure 30:
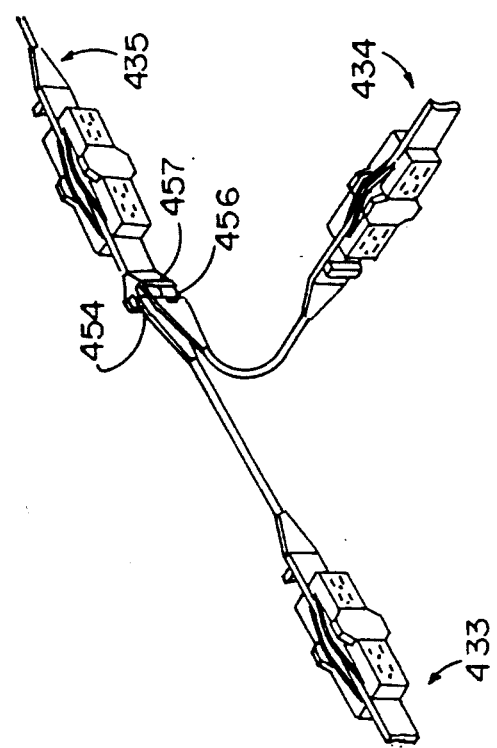
FIG. 30 is another fragmentary perspective view of the electrification system according to FIG. 28.
Figure 29:
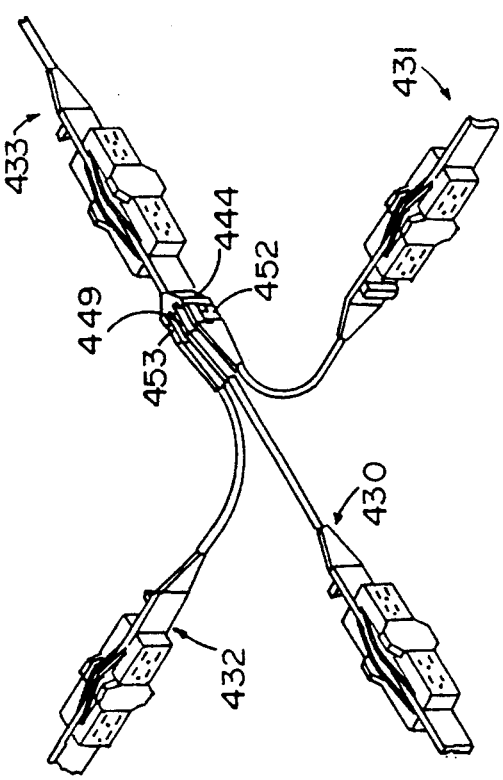
FIG. 29 is a fragmentary perspective view of the electrification system according to FIG. 28.
Figure 31:
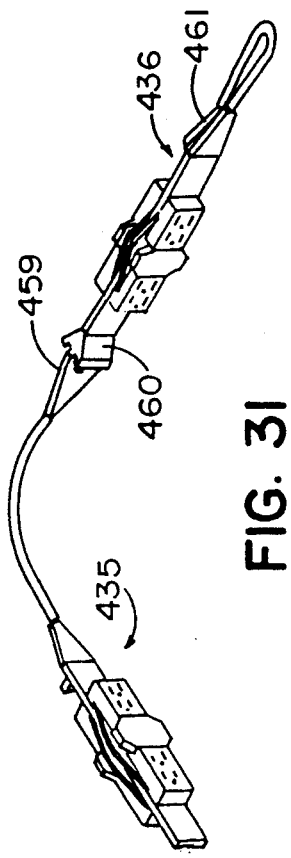
FIG. 31 is yet another fragmentary perspective view of the electrification system according to FIG. 28.

To disconnect connector 89 and power block 90, the installer inserts flat implement 428 (FIG. 25) between side 416 of attachment projection 410 and side 208 of recess 202. Upon rotation of the flat implement as illustrated in FIG. 26, projections 193 of intermediate connector 177 are pulled out of recesses 192 of power block 90 and intermediate connector 177 of position illustrated in FIG. 27. Implement 428 pivots to a position against sides 417 and 418 of attachment projection 410 and side 207 of recess 202. Side 418 prevents implement 416 from sliding downwardly when the implement is rotated.

The recess 202 and attachment projection 410 provide a means of exerting a substantial force to connect and disconnect two members using a flat implement. This is especially advantageous in the limited confines of a utility raceway since it is difficult for an installer to insert a hand between the powerway and the side of the utility raceway. Although the illustrated embodiment includes intermediate connector 177 between male connector 89 and female connector 183, it is envisioned that the attachment projections 410 can be provided on connector 89 such that connector 89 is directly connected to connector 183.

The optional light harness 64 includes a housing 418 (FIG. 9) including integral silos 215 which are inserted into openings 214 (FIG. 3) in receptacle block 213 of housing member 92. A female contact (not shown) is housed within each silo 215 (FIG. 9) for connection with a blade 122, 135 (FIG. 4) housed within each opening 214 of receptacle block 213. The light harness includes conventional plugs 419 (FIG. 9)and 420 which connect with conventional mating plugs (not shown) from a light source (not shown). Plugs 419 and 420 are conventional, and thus are not described in greater detail hereinafter. Plug 419 is connected with 3 female contacts (not shown) in housing 418 through conductors 421–423. Plug 420 is connected to 3 contacts (not shown) in housing 418 through conductors 424–426. Plugs 419 and 420 may be connected to the same or different contacts in silos 215. The ones of bus bar conductors 68–77 to which the plugs 419 and 420 are connected depends upon which silo 215 the female contacts connected to plugs 419 and 420 are assembled in. Thus, plugs 419 and 420 may be connected to the same or different conductors in power way 21.

An exemplary powerway interconnection of a panel electrification system will now be described with reference to FIGS. 28-31. The wall panel system utilizes powerways 430–436 in respective panel utility raceways of panels 437–443 respectively. Powerways 437–443 are identical to powerway 21. The power tap-in 28 is connected to a three connector power block 448 of powerway 430. An "X-connection" (FIG. 29) is provided by connecting a male type-1 connector 449 of powerway 430, male type-1 connector 452 of powerway 431, and male type-1 connector 453 of powerway 432 to three connector powerblock 444 of powerway 433. A "T-connection" (FIG. 30) is provided by connecting male type-1 connector 454 of powerway 433 and a male type-1 connector 456 of powerway 434 to three connector power block 457 of powerway 435. An "L-connection" (FIG. 31) is provided by connecting male type-1 connector 459 of powerway 435 to three connector power block 460 of powerway 436. Male type-1 connector 461 of powerway 436 is not connected to any female type-1 connector. Thus it can be seen that the three connector power block provides versatile branching in the electrical system connected to common power tap-in 28.

Accordingly, it can be seen that a panel electrification system providing ease of installation and versatility in rearrangement is disclosed. Each of the outlet blocks supported on a powerway is readily connected to different supply circuits by selecting an appropriate jumper. Furthermore, jumpers are easily changed to connect the outlets of an outlet block to different power supplies in the powerway. Additionally, components in the power distribution system are interconnected without an installer inserting a hand into the utility raceway.

In the foregoing description, it will be readily perceived by those skilled in the art that modifications may be made to the invention without departing from the concepts disclosed herein. Such modifications are to be considered included in the following claims, unless these claims by their language expressly state otherwise.

We claim:

1. A power distribution unit for office furniture of the type having a utility raceway, comprising:
   a power block including a power block housing adapted to be assembled within the utility raceway of associated office furniture;
   a plurality of power block conductors positioned in said power block housing;
   a first outlet positioned adjacent said power block;
   a second outlet positioned adjacent said power block;
   a first connector associated with said first outlet and not associated with said second outlet;
   a second connector associated with said second outlet and not associated with said first outlet; and
   a jumper including at least one jumper conductor, said at least one said jumper conductor selectively connecting said first and second connectors to at least one of said power block conductors when said jumper is connected to said power block and said first and second connectors, whereby said jumper may be manipulated to select the power block conductors to which said first and second connectors and the outlets associated therewith are connected.

2. The power distribution system as defined in claim 1, wherein said jumper includes a jumper housing and said jumper conductors are supported within said jumper housing.

3. The power distribution system as defined in claim 2, wherein each of said jumper conductors includes at least one contact, and each contact is adapted to be connected to one of said first and second power block conductors.

4. The power distribution system as defined in claim 1, further including an outlet block, wherein said first and second outlets include respective outlet openings on said outlet block and said first and second connectors are accessible through respective ones of said outlet openings.

5. The power distribution system as defined in claim 4, wherein said plurality of power block conductors include at least four conductors connected to at least two power supplies, whereby said jumper is used to select the power supply to which said first and second connectors are connected.

6. The power distribution system as defined in claim 1, comprising at least two said jumper conductors including a first jumper conductor connected to said first connector and a second jumper conductor connected to said second connector when said jumper is connected to said first and second connectors.

7. The power distribution system as defined in claim 6, wherein said plurality of power block conductors includes at least four conductors coupled to at least two power supplies, and said first jumper conductor connects said first connector to a first one of said power supplies and said second jumper conductor connects said second connector to a second one of said power supplies.

8. The power distribution system as defined in claim 1, wherein each of said jumper conductors include two contacts for connection to said first and second connectors, respectively.

9. The power distribution system as defined in claim 1, wherein said power block includes at least one power block ground conductor supported in said power block and said outlet block includes an outlet block ground connector adapted to connect to said at least one power block ground conductor.

10. The power distribution system as defined in claim 9, wherein said at least one power block ground conductor includes a ground conductor connected to safety ground and a ground conductor connected to isolated ground.

11. The power distribution system as defined in claim 10, wherein said outlet block ground connector is connected to said power block ground conductor connected to safety ground or said power block ground conductor connected to isolated ground.

12. The power distribution unit as defined in claim 1, wherein said power block is part of a powerway having a first end, said first end including at least one sidewall, said sidewall including at least one projection, and said projection including an outer edge, and said powerway including a second end, said second end including a second connector and at least one arm projecting outwardly from said second end, said at least one arm including a recess, and said recess including a periphery.

13. The power distribution system as defined in claim 1, further including a third connector associated with said first outlet and fourth connector associated with said second power outlet.

14. A powerway for modular furniture of the type including a utility raceway, comprising:
a power block including a power block housing adapted to be assembled within the utility raceway of the modular furniture, said power block housing supported on a first end of said powerway, said power block housing including at least three first connectors;
a plurality of conductors positioned in said power block housing; and
a second connector carried on a second end of said power block generally opposite said first end, wherein said first connectors are adapted to be connected with second connectors of powerways associated with adjacent furniture units whereby said power block is adapted to be connected with at least three of said second connectors.

15. The powerway as defined in claim 14, further including an elongated substantially rigid cover, said power block positioned at least partially within said cover.

16. The powerway as defined in claim 14, further including a flexible cable, said second connector carried on one end of said cable, whereby said flexible cable facilitates manipulation of the position of said second connector.

17. The powerway as defined in claim 14, wherein each of said first and second connectors includes a plurality of contacts.

18. The powerway as defined in claim 14, further including a outlet block adapted to be assembled to said power block, said outlet block housing outlet conductors, and a jumper adapted to connect said conductors of said outlet block to said conductors supported in said power block, whereby the connection of said outlet conductors to the power block is selected using said jumper.

19. The powerway as defined in claim 14, further including a first connector including a first end, said first end including at least one sidewall, said sidewall including at least one projection, and said projection including an outer edge, and further including a second end, said second end including a second connector, and at least one arm projecting outwardly from said second end, said at least one arm including a recess, and said recess including a periphery.

20. In an office furniture system of the type having a plurality of individual furniture units positioned side-by-side in a predetermined orientation, and wherein each of said furniture units includes a utility raceway therethrough accessible at opposite sides of said furniture unit, the improvement of a modular powerway for each of said furniture units, each said powerway comprising:
an elongated housing received within the utility raceway of an associated one of said furniture units, and including first and second ends thereof positioned adjacent opposite ends of said utility raceway;
conductors mounted in said housing for conducting electrical power between opposite ends of said powerway;
end thereof, and including first, second and third sets of vertically oriented, quick-disconnect power connectors arranged in a side-by-side fashion, and electrically connected with said electrical conducting means;
a power tap electrically connected with said electrical conducting means, and adapted to tap electrical power from said powerway; and
a flexible flag connector having one end thereof fixedly mounted in said housing adjacent said second end thereof, and including a flag terminal mounted on the opposite end of said flag connector, and movable relative to said housing; said flag terminal including a set of quick-disconnect power connectors electrically connected with said electrical conducting means, and adapted to mate with one of the first, second and third sets of quick-disconnect power connectors associated with another one of said powerways, whereby adjacent powerways may be electrically interconnected in "L", "T", "X" and in-line relationships by connecting the quick-disconnect connectors on the flag terminal of each powerway with an adjacent one of the first, second and third sets of quick-disconnect connectors on the power terminal of an adjacent powerway.

21. In an office furniture unit of the type having a utility raceway therethrough accessible at opposite sides of said furniture unit, the improvement of a modular powerway comprising:

an elongated housing received within the utility raceway of said furniture unit, and including first and second ends thereof positioned adjacent opposite ends of said utility raceway;

means mounted in said housing for conducting electrical power between opposite ends of said powerway;

a power terminal mounted in said housing adjacent said first end thereof, and including first, second and third sets of vertically oriented, quick-disconnect power connectors arranged in a side-by-side fashion, and electrically connected with said electrical conducting means;

a power tap electrically connected with said electrical conducting means, and adapted to tap electrical power from said powerway; and a flexible flag connector having one end thereof fixedly mounted in said housing adjacent said second end thereof, and including a flag terminal mounted on the opposite end of said flag connector, and movable relative to said housing; said flag terminal including a set of quick-disconnect power connectors electrically connected with said electrical conducting means, and adapted to mate with one of the first, second and third sets of quick-disconnect power connectors on a power terminal of a powerway associated with another furniture unit, whereby adjacent powerways may be electrically interconnected in "L", "T", "X" and in-line relationships by connecting the quick-disconnect connectors on the flag terminal of each powerway with an adjacent one of the first, second and third sets of quick-disconnect connectors on the power terminal of an adjacent powerway.

22. A modular powerway for an office furniture unit and the like, of the type having a utility raceway therethrough accessible at opposite sides of the furniture unit, said modular powerway comprising:

an elongated housing shaped for reception within the utility raceway of the furniture unit, and including first and second ends thereof configured for positioning adjacent opposite ends of the utility raceway;

means mounted in said housing for conducting electrical power between opposite ends of said powerway;

a power terminal mounted in said housing adjacent said first end thereof, and including first, second and third sets of vertically oriented, quick-disconnect power connectors arranged in a side-by-side fashion, and electrically connected with said electrical conducting means;

a power tap electrically connected with said electrical conducting means, and adapted to tap electrical power from said powerway; and a flexible flag connector having one end thereof fixedly mounted in said housing adjacent said second end thereof, and including a flag terminal mounted on the opposite end of said flag connector, and movable relative to said housing; said flag terminal including a set of quick-disconnect power connectors electrically connected with said electrical conducting means, and adapted to mate with one of the first, second and third sets of quick-disconnect power connectors on a power terminal of a powerway associated with another furniture unit, whereby adjacent powerways may be electrically interconnected in "L", "T", "X" and in-line relationships by connecting the quick-disconnect connectors on the flag terminal of each powerway with an adjacent one of the first, second and third sets of quick-disconnect connectors on the power terminal of an adjacent powerway.

23. A mechanical connector for connecting components of a power distribution unit in a utility raceway of office furniture, comprising:

a first connector including a housing, said connector housing including a first end and at least one sidewall, said sidewall including at least one projection, and said projection including an outer edge; and a powerway including a second end, said second end including a second connector adapted to interconnect with said first connector, and said powerway including at least one arm projecting outwardly from said second end, said at least one arm including a recess, and said recess including a periphery, said projection accessible through said recess when said first end abuts said second end whereby, when said first and second connectors are disconnected, a substantially flat implement inserted between said edge of said projection and said periphery of said recess is used to interconnect said first and second connectors, and when said first and second connectors are interconnected, a substantially flat implement inserted between said edge of said projection and said periphery of said recess is used to disconnect said first and second connectors.

24. A mechanical connector as defined in claim 23, wherein said edge of said at least one projection includes a first projection sidewall, a second projection sidewall extending nonlinearly from one end of said first projection sidewall, and a third sidewall extending nonlinearly from said second sidewall, said second and third projection sidewalls providing a pivot for said implement and said first sidewall preventing sliding of said implement when said implement pivots on said second and third projection sidewalls.

25. The mechanical connector as defined in claim 23, wherein said recess includes at least a first recess sidewall and a second recess sidewall extending nonlinerearly from said first recess sidewall whereby the flat implement pivots around said first and second recess sidewalls to move said first housing relative to said second housing.

26. The mechanical connector as defined in claim 23, wherein said first connector includes electrical contacts and said second connector includes electrical conductors, whereby said electrical contacts and said electrical conductors are interconnected when said first and second connectors interconnect.

27. The mechanical connector as defined in claim 26, wherein said first connector housing includes a third end opposite said first end, and further including a third connector including a third connector housing, said third connector housing including a fourth connector connected to said third end, whereby said first connector housing is connected between said second connector and said fourth connector.

28. A mechanical connector, comprising:
a first housing including a first end and at least one housing sidewall, said sidewall including at least one projection, and said projection including an outer edge, said first end including a first connector; and
a second housing including a second end, said second end including a second connector adapted to interconnect with said first connector, and said housing including at least one arm projecting outwardly from said second end, said at least one arm including a recess, and said recess including a periphery, said projection accessible through said recess when said first end abuts said second end whereby a substantially flat implement inserted between said edge of said projection and said periphery of said recess is used to interconnect said first and second connectors.

29. A mechanical connector as defined in claim 28 wherein said edge of said at least one projection includes a first projection sidewall, a second projection sidewall extending nonlinerealy from one end of said first projection sidewall, and a third projection sidewall extending nonlinerearly from said second projection sidewall, said second and third projection sidewalls providing a pivot for said implement and said first sidewall preventing sliding of said implement when said implement pivots around said second and third projection sidewalls.

30. The mechanical connector as defined in claim 28, wherein said recess includes at least a first recess sidewall and a second recess sidewall extending nonlinerearly from said first recess sidewall whereby the flat implement pivots around said first and second recess sidewalls to move said first housing relative to said second housing.

31. A mechanical connector, comprising:
a first housing including a first end and at least one sidewall, said sidewall including at least one projection, and said projection including an outer edge, said first end including a first connector; and
a second housing including a second end, said second end including a second connector interconnected with said first connector, and said housing including at least one arm projecting outwardly from said second end, said at least one outwardly projecting arm including a recess, and said recess including a periphery, said projection accessible through said recess whereby a substantially flat implement inserted between said edge of said projection and said periphery of said recess is used to disconnect said first and second connectors.

* * * * *

UNITED STATES PATENT AND TRADEMARK OFFICE
CERTIFICATE OF CORRECTION

PATENT : 5,252,086

DATED : October 12, 1993

INVENTOR(S) : Scott H. Russell

It is certified that error appears in the above-identified patent and that said Letters Patent is hereby corrected as shown below:

Column 1, line 38;

After "supplies" insert --.--.

Column 1, line 49;

After "itself" insert --.--.

Column 2, line 5;

After "block" insert --.--

Column 4, line 36;

"23 cf" should be --23 of--.

Column 5, line 45;

After "hereinafter" insert --.--.

Column 6, line 54;

"5;" should be --5)--.

Column 7, line 23;

After "177" insert --.--

UNITED STATES PATENT AND TRADEMARK OFFICE
CERTIFICATE OF CORRECTION

PATENT : 5,252,086

DATED : October 12, 1993

INVENTOR(S) : Scott H. Russell

It is certified that error appears in the above-identified patent and that said Letters Patent is hereby corrected as shown below:

Column 12, line 27;

"180" should be --180°--.

Column 12, line 59;

"opening" should be --openings--.

Column 18, lines 52 & 53, claim 25;

"nonlinerearly" should be --nonlinearly--.

Column 19, line 24, claim 29;

"nonlinerealy" should be --nonlinearly--.

Column 19, line 26, claim 29;

"nonlinerearly" should be --nonlinearly--.

UNITED STATES PATENT AND TRADEMARK OFFICE
CERTIFICATE OF CORRECTION

PATENT    :  5,252,086

DATED     :  October 12, 1993

INVENTOR(S) :  Scott H. Russell

It is certified that error appears in the above-identified patent and that said Letters Patent is hereby corrected as shown below:

Column 20, lines 6 & 7, claim 30;
"nonlinerearly" should be --nonlinearly--.

This Certificate supersedes Certificate of Correction issued August 23, 1994

Signed and Sealed this

Eleventh Day of October, 1994

Attest:

BRUCE LEHMAN

Attesting Officer   Commissioner of Patents and Trademarks